United States Patent
Vernon et al.

[15] 3,650,520
[45] Mar. 21, 1972

[54] ENERGY ABSORBING DEVICE

[72] Inventors: John T. Vernon; Albert M. Ankrom, both of Charlotte, N.C.

[73] Assignee: Rogers Corporation, Rogers, Conn.

[22] Filed: June 29, 1970

[21] Appl. No.: 50,742

[52] U.S. Cl............................................267/152, 267/141
[51] Int. Cl.......................................................F16f 1/44
[58] Field of Search........................267/14 D, 141, 152, 153

[56] References Cited

UNITED STATES PATENTS 3,236,513  2/1966  Nicolaisen..........................267/153
3,230,880  1/1966  Beaver...............................267/153

Primary Examiner—James B. Marbert
Attorney—Fishman and Van Kirk

[57] ABSTRACT

An energy absorbing device formed from an integral molded unit of an elastomeric material such as polyurethane. The unit is composed of an annular body portion having an elliptical configuration with relatively thick wall sections and a pair of impact elements projecting from the outer surface of the body portion at stations which lie generally along the minor axis of the elliptical configuration. The resilience of the body portion, and to a more limited extent the impacting elements, allows the device to absorb energy when objects strike the projecting ends of the impact elements.

8 Claims, 3 Drawing Figures

Patented March 21, 1972 3,650,520

INVENTORS
JOHN T. VERNON
ALBERT M. ANKROM

BY *Fishman and Van Kirk*

ATTORNEYS 3,650,520

ENERGY ABSORBING DEVICE

BACKGROUND OF THE INVENTION

1. FIELD OF THE INVENTION

This invention relates to the field of energy absorbing devices and in particular the invention is directed to absorbing devices of the type in which energy dissipation occurs through the deformation or working of an elastomeric material.

2. DESCRIPTION OF THE PRIOR ART

Energy absorbing devices which employ an elastomeric material are already known in the prior art. Such devices, as shown in FIG. 1, are frequently composite structures including both metallic elements and a solid body of elastomeric material. The principal energy absorbing component is the elastomeric material which dissipates energy due to the inherent damping characteristics of the material. The metallic components provide a hard wear surface which is intended to withstand the high impact loads and abrasive action at the interface between an impacting object and the absorber.

The composite absorbers, however, suffer several disadvantages. The metallic element, while providing a hard wear surface, becomes brittle with usage due to the cold working of the metal. The cold working is particularly noticeable where the impacting component is also metallic and therefore less likely to attenuate the shock loads during impact. Continued cold working of the metallic elements results in fracture of the embrittle elements or continued chipping and flaking at the impact surface. This destruction of the elements may require replacement at frequent intervals during periods of heavy and continuous use.

The composite absorbers with metallic members which contact an impacting object are not only subject to wear themselves, but also produce wear on the impacting object. Metal-to-metal contact may cause abrasion on both of the metallic pieces. Replacement of both metallic pieces may significantly increase the operating costs of a machine which employs the composite absorbers. Still further, the composite absorbers are frequently more expensive due to the multi-piece construction of the devices. Both the metallic elements and the elastomeric material must be manufactured separately and subsequently assembled before the complete energy absorption device is formed.

SUMMARY OF THE INVENTION

The present invention overcomes the several disadvantages of the prior art devices by constructing an energy absorbing device in the form of an integral molded elastomeric unit having impact elements and an annular body portion. The annular body portion flexes upon impact on the impact elements, thus imparting an effect similar to compression to a body of essentially incompressible material. The elastomeric impact units do not suffer from cold working and do not damage the elements impacting on them.

It is accordingly an object of the present invention to provide an energy absorbing device which is formed in an integral unit.

It is a further object of the present invention to provide an energy absorbing device which is not subject to cold working and brittle fracture after extended use.

It is another object of the present invention to provide an energy absorbing device which is relatively inexpensive to manufacture when compared with composite energy absorbers known in the prior art.

It is still a further object of the present invention to provide an energy absorbing device having an annular flexible body portion for load dissipation.

It is still a further object of the present invention to provide an energy absorbing device composed entirely of an elastomeric material.

It is still a further object of the present invention to provide an energy absorbing device which reduces the amount of wear on objects which impact on the device.

BRIEF DESCRIPTION OF THE DRAWINGS

The novel elastomeric energy absorbing device of the present invention together with its numerous objects and advantages will be better understood by reference to the following drawings in which corresponding elements bear the same reference numerals through the several figures.

DESCRIPTION OF THE PREFERRED EMBODIMENTS

Figure 1:
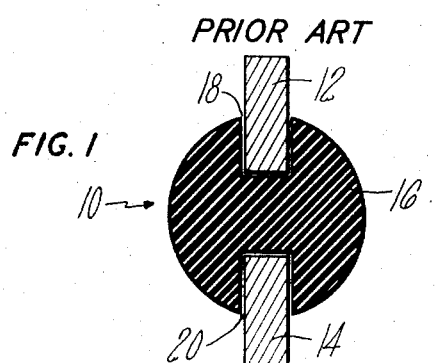
FIG. 1 is a cross-sectional view of a composite energy absorbing device known in the prior art.

In order to more clearly understand the present invention, it is appropriate to briefly examine the energy absorbing devices which form a part of the prior art. FIG. 1 discloses a damping or energy absorbing device which has been employed in the past in the same environment as that contemplated for the novel energy absorbing device of the present invention. The prior art absorber, generally designated by the numeral 10, is a composite of both metallic and elastomeric pieces. The absorber 10 includes hardened metal inserts 12 and 14 which are mounted in an elastomeric support 16. The support 16 is a molded structure and has a spherical shape with recesses 18 and 20 at diametrically opposite stations on the spherical surface. The recesses 18 and 20 are sized to receive the inserts 12 and 14 and have a depth which permits a substantial portion of each insert to project well above the spherical surface.

In operation, the absorber 10 is supported in a fixture so that the metal inserts project outwardly as stops. When an object impacts on the projecting end of the insert, energy is transmitted by the insert to the support 16 where dissipation takes place. The inserts 12 and 14 are disposed on opposite sides of the support 16 so that two different objects can approach the absorber simultaneously and dissipate the kinetic energy of the objects within the support 16 without transmitting loads to a mounting fixture holding the support.

If the absorber 10 is embodied in a machine where the projecting ends of the inserts 12 and 14 are continuously subjected to impacting objects, cold working of the metal at the projecting ends causes embrittlement and subsequent fracture of the inserts. Continuous replacement of the inserts due to the fractures renders the operation of the machine more expensive in view of both lost operating time and the repair costs. Furthermore, the metallic objects which impact on the inserts are also subject to rapid wear because of the metal-to-metal contact which occurs under the severe impact conditions.

Figure 2:
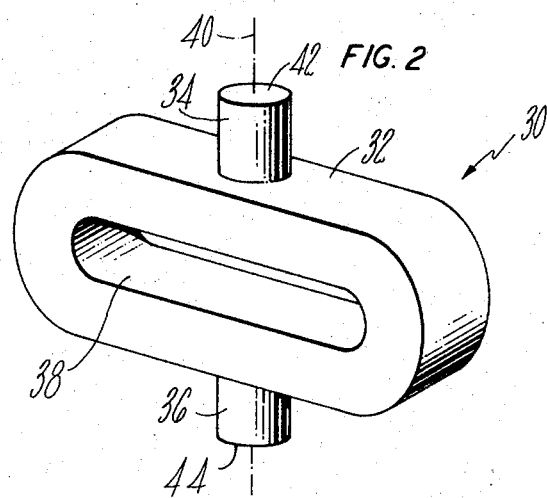
FIG. 2 is a perspective view of the elastomeric energy absorbing device of the present invention.

FIG. 2 reveals the novel elastomeric energy absorbing device of the present invention in a preferred embodiment. The device, generally designated by the numeral 30, differs in several respects from the prior art device of FIG. 1. One of the principal features of the device 30 is that it is composed completely of an elastomeric material such as polyurethane elastomer. Such resilient materials can be formed into integral elements by a simple molding process. In the integral form, the absorber 30 is constructed in substantially fewer steps than the device 10 in FIG. 1. Since the molding of the support 16 or the entire device 30 entails substantially the same steps, the manufacturing steps concerned with constructing and inserting the metal inserts 12 and 14, which constitute additional operations and add to the cost of the prior art device 10, are eliminated.

In examining the new and improved energy absorbing device 30, several important structural distinctions aside from its integral form are to be noted. The device 30 is composed of an annular body portion 32 which is centrally disposed between two projecting legs 34 and 36. The annular body portion 32 forms a complete ring having a generally elliptical configuration in the unloaded condition shown in FIG. 2. The body portion 32 has a thick wall section which limits the central aperture 38 to a relatively narrow elliptical configuration. The heavy wall section of the body portion 32 is provided because the elastomeric material within the walls forms the principal element for dissipating energy. The central aperture 38 is important, however. The aperture allows device 30 to deform and also isolates shock loads applied to one side of the absorber from the other side.

Elastomeric legs 34 and 36 are disposed at diametrically opposite stations on the outer surface of the body portion 32. With respect to the elliptical configuration of the body portion 32, the legs 34 and 36 are positioned near the minor axis 40 of the ellipse and project generally in a direction parallel to the minor axis. As mentioned above, the device 30 is made in an integral form and therefore the legs 34 and 36 consist of the same elastomeric material as the body portion 32. The integral construction eliminates the possibility of the legs falling out of the body portion and does not require special connecting material between the legs in the body portion.

Since legs 34 and 36 are also formed of an elastomeric material, an additional energy absorbing element is available in the device 30 in contrast to the prior art absorber 10. Even though elastomeric materials, such as polyurethane, are basically incompressible mediums, a certain amount of damping is provided by the leg and this additional amount of resiliency may result in a substantial reduction in the level of shock loads when the absorber performs its energy-dissipating function.

Legs 34 and 36 possess impact surfaces 42 and 44, respectively, which lie in a plane generally perpendicular to the axis 40. It will be readily understood that the impact surfaces 42 and 44 present a substantially softer impact surface than the corresponding surfaces of metal inserts 12 and 14 in FIG. 1. As a consequence, when an object impacts on the device 30 the possibility of abrasion occurring between the legs and the object is negligible. Accordingly, less wear on the impacting object takes place. Even though the abrasive aspects of the device 30 are ameliorated, the essential energy absorbing feature is retained. In transmitting energy through either of the legs, a limited amount of deformation with shear is experienced. The body portion 32, however, provides the principal source of energy dissipation.

SInce legs 34 and 36 are formed from an elastomeric material, the continuous impacting of objects on surfaces 42 and 44 does not result in embrittlement of the legs; therefore, no fracture failures are experienced as in the prior art devices. The use of an elastomeric impact element, such as leg 34, in place of a metallic insert, such as insert 12 in FIG. 1, provides not only increased deformation but also eliminates the type of failures experienced in the prior art devices.

Figure 3:
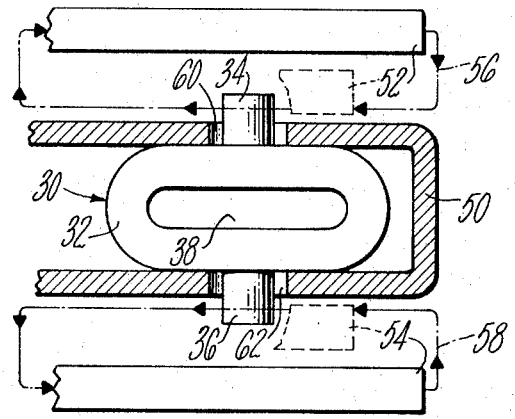
FIG. 3 is a cross-sectional view of a machine showing a typical installation and working environment for the novel energy absorbing device.

In FIG. 3 the novel energy absorbing device 30 is disclosed in a working environment. While the device 30 can be employed in numerous machines and structures, the apparatus shown in FIG. 3 represents a portion of a pin drafter such as that made by the Warner Swazey Co. of Cleveland, Ohio. Such apparatus is employed in fiber processing machines for combing long staple fibers. The pin drafter has a stationary slide 50 and two movable follower bars 52 and 54. The follower bars 52 and 54 carry combs (not shown) and are continuously translated in a generally rectangular path indicated by the arrows 56 and 58 to pull the combs through the fibers. In traversing the generally rectangular paths, the follower bars 52 and 54 impact simultaneously on opposite sides of the slide 50. After reaching the impact position, the bars 52 and 54 are translated along the surfaces of the bars as indicated by the phantom position of the bars. Since the combing operation forms no part of the present invention, the details of the mechanism which translates the follower bars is not shown.

The energy absorbing device 30 is mounted in the hollow central portion of the slide 50 at the impact position of the bars 52 and 54. The device 30 is held in the slide 50 by means of cut-outs 60 and 62 through which the legs 34 and 36 respectively project. The cut-outs 60 and 62 are slightly larger than the legs 34 and 36 so that no binding occurs between the slide 50 and the legs. With ample clearance, none of the impact load will be transmitted to the slide 50 and energy dissipation will occur within the device 30 itself.

The function of the central aperture 38 in the body portion 32 is more clearly understood from the installation shown in FIG. 3. As the two follower bars 52 and 54 impact on the legs 34 and 36, the elastomeric body portion 32 is allowed to deflect inwardly toward the central aperture 38. If the two bars 52 and 54 strike the absorbing device simultaneously, the energy is absorbed entirely within the device 30. If the two follower bars are not moving toward the slide 50 with substantially the same energy, aperture 38 isolates one-half of the absorber from the other half so that energy is not transmitted through the absorber to the opposite follower bar. The aperture 38 therefore provides both resiliency and isolation.

While the absorber is shown in FIG. 3 as performing a dual function, that is operating with two impacting objects, it will be readily understood that the energy absorbing device can operate equally as well where only a single object impacts on one of the projecting legs. In such circumstances, it may be sufficient to provide only one leg on the outer surface of the annular body portion 32. Other modifications to the structure of the device 30 can also be made without departing from the spirit of the invention. For example, the precise elliptical configuration of the body portion 32 may be varied to change the energy absorbing characteristics of the device. The dimensions of the body portion including the size and dimensions of the wall sections may be varied to suit particular functions. It is similarly feasible to employ a wall section for the body portion which is other than the generally rectangular shape in cross section as reflected by the embodiment in FIG. 2. Oval or circular sections may be employed with equal advantage. Likewise, the shape of the legs can be varied for special functions. Accordingly, the novel energy absorbing device 30 has been disclosed in one preferred embodiment for purposes of illustration rather than limitation.

What is claimed is:

1. An energy absorbing device comprising:
    an annular body portion composed of an elastomeric material; and
    at least a first impact element projecting outwardly from the outer surface of said body portion, said impact element being integral with said body portion and composed of the same elastomeric material as the body portion.

2. The elastomeric energy absorbing device of claim 1 wherein:
    the elastomeric material forming the integral body portion and impact element is a molded polyurethane elastomer.

3. The energy absorbing device of claim 1 wherein:
    the annular body portion has a central aperture with a generally elliptical configuration with the device in the unloaded condition.

4. The energy absorbing device of claim 3 wherein:
    the impact element projects outwardly from the body portion at a point on the outer surface of the body portion which lies substantially along the minor axis of the elliptical aperture.

5. The energy absorbing device of claim 1 wherein:
    a second integral impact element projects outwardly from the outer surface of the annular body portion, said second impact element extending from the outer surface of the body portion at a position remote from the first impact element and being composed of the elastomeric material forming the body portion.

6. The energy absorbing device of claim 5 wherein:
    the second impact element is located on the outer surface of the annular body portion at a position generally diametrically opposite the first impact element.

7. The energy absorbing device of claim 6 wherein:
    the annular body portion has an elliptical configuration; and
    the first and second impact elements are disposed on the outer surface of the body portion at positions lying substantially on the minor axis of the elliptical configuration and project along the minor axis.

8. The elastomeric energy absorbing device of claim 7 wherein the elastomeric material forming the integral body portion and impact elements is a molded polyurethane.

* * * * *